US007548229B2

(12) United States Patent
Oh

(10) Patent No.: US 7,548,229 B2
(45) Date of Patent: Jun. 16, 2009

(54) MULTI-DISPLAY SYSTEM AND CONTROL METHOD THEREOF

(75) Inventor: Byung-hoon Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 714 days.

(21) Appl. No.: 11/143,588

(22) Filed: Jun. 3, 2005

(65) Prior Publication Data
US 2006/0007106 A1    Jan. 12, 2006

(30) Foreign Application Priority Data
Jun. 18, 2004    (KR) ...................... 10-2004-0045750

(51) Int. Cl.
*G09G 3/36* (2006.01)
(52) U.S. Cl. .................... 345/102; 345/1.1; 345/207
(58) Field of Classification Search ................. 345/1.1, 345/102, 204, 207
See application file for complete search history.

(56) References Cited

U.S. PATENT DOCUMENTS

| 5,218,457 | A | * | 6/1993 | Burkhardt et al. ........... 358/448 |
| 6,570,505 | B1 | | 5/2003 | Malenfant |
| 6,714,172 | B2 | | 3/2004 | Matsuzaki et al. |
| 6,954,364 | B2 | * | 10/2005 | Min ...................... 363/56.08 |
| 7,304,633 | B2 | * | 12/2007 | Kim et al. .................... 345/102 |
| 2002/0140379 | A1 | * | 10/2002 | Chevalier et al. ........... 315/291 |
| 2002/0161556 | A1 | | 10/2002 | Williams et al. |
| 2003/0231161 | A1 | * | 12/2003 | Yamaguchi ................. 345/102 |

FOREIGN PATENT DOCUMENTS

GB    2 284 952 A    6/1995

| JP | 2000-330205 | 11/2000 |
| KR | 1999-32922 | 5/1999 |
| KR | 1999-35109 | 5/1999 |
| KR | 20-269939 | 3/2002 |
| KR | 2003-0055616 | 7/2003 |
| KR | 10-0422166 | 2/2004 |
| KR | 2004-26185 | 3/2004 |
| KR | 10-2004-0100858 | 12/2004 |

OTHER PUBLICATIONS

International Search Report issued on Sep. 7, 2005, for PCT/KR2005/001576.
European Search Report issued Aug. 18, 2008 EP 05 74 4923.

* cited by examiner

Primary Examiner—Richard Hjerpe
Assistant Examiner—Tom V Sheng
(74) Attorney, Agent, or Firm—Stanzione & Kim, LLP

(57) ABSTRACT

A multi-display system having a plurality of display apparatuses respectively having at least one backlight, includes a backlight state detector provided in each of the plurality of display apparatuses to detect a defective state of the backlight, a communication interface provided in each of the plurality of display apparatuses, a display controller provided in each of the display apparatuses to generate a corresponding signal for each of the display apparatuses through the communication interface on the basis with a detecting result of the backlight state detector, and a host device having a display, a communication part to communicate with each of the plurality of display apparatuses, and a host controller to display a message on the display to inform that the backlight of a corresponding display apparatus is defective if it is determined that the backlight is defective according to the signal generated from the display controller. With this configuration, multi-display apparatus simply detects a defective backlight of a plurality of display apparatuses from a host device.

15 Claims, 5 Drawing Sheets

FIG. 4

DISPLAY 3 : BACKLIGHT DEFECT
DISPLAY 1 : BACKLIGHT DEFECT

MULTI-DISPLAY SYSTEM AND CONTROL METHOD THEREOF

CROSS-REFERENCE TO RELATED APPLICATIONS

This application claims the benefit of Korean Patent Application No. 2004-45750, filed on Jun. 18, 2004, in the Korean Intellectual Property Office, the disclosure of which is incorporated herein in its entirety and by reference.

BACKGROUND OF THE INVENTION

1. Field of the Invention

The present general inventive concept relates to a multi-display system and a control method thereof, and more particularly, to a multi-display system and a control method thereof providing a host device to readily detect a defective backlight in each of a plurality of display apparatuses.

2. Description of the Related Art

In recent, an airport or a train station displays information about flight schedules or departure/arrival schedules using a plurality of display apparatuses such as a giant liquid crystal display (LCD) monitor or a plasma display panel (PDP) monitor, and these display apparatuses are called a vertical market business (VMB) model.

A common LCD monitor requires four backlights, and thus it is easy to detect a defect backlight because the LCD monitor displays a dark screen if one of the backlights is turned off, but the giant LCD monitor as the VMB model needs a plurality of backlights, and thus it is difficult to detect the defective backlight because one defective backlight out of the plurality of defect-free backlights does not make any visible difference.

In addition, there is no proper method to manage a defective backlight in the plurality of display apparatuses individually from the host device.

SUMMARY OF THE INVENTION

Accordingly, the present general inventive concept provides a multi-display apparatus to readily detect a defective backlight of a plurality of display apparatuses from a host device.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a multi-display system comprising a plurality of display apparatuses respectively having at least one backlight, a backlight state detector provided in each of the plurality of display apparatuses to detect a defective state of the backlight, a communication interface provided in each of the plurality of display apparatuses, a display controller provided in each of the display apparatuses to generate a corresponding signal for each of the display apparatuses through the communication interface on the basis of a detecting result of the backlight state detector, and a host device comprising a display, a communication part to communicate with each of the plurality of display apparatuses, and a host controller to display a message on the display to inform that the backlight of a corresponding display apparatus is defective if it is determined that the backlight is defective according to the signal generated from the display controller.

The backlight state detector may comprise an AC-DC converter to convert an AC voltage output from the backlight into a DC voltage, a reference voltage supplier to supply a reference voltage, a comparator to compare the DC voltage generated from the AC-DC converter with the reference voltage supplied by the reference voltage supplier and to generate a comparing result signal, and a switch turned on/off according to the comparing result signal from the comparator and to generate a backlight state detecting signal.

The multi-display system may further comprise an interrupt generator to generate an active interrupt signal and to output the active interrupt signal to the display controller if the interrupt generator receives the backlight state detecting signal that at least one backlight is defective from the backlight detector.

The interrupt generator may comprise a first switch turned on/off according to the backlight state detecting signal generated from each of the backlight state detectors, and a second switch to generate an interrupt signal in accordance with the first switch being turned on/off.

The foregoing and/or other aspects and advantages of the present general inventive concept may also be achieved by providing a method of controlling a multi-display system comprising a plurality of display apparatuses respectively having at least one backlight, the method comprising detecting a defective state of the backlight in each of the plurality of display apparatuses, generating a corresponding signal for each of the plurality of display apparatuses on the basis of the detecting result to output to a host device from the display apparatus, and displaying a message informing that the backlight of a corresponding display apparatus is defective if the host device determines that the backlight is defective according to the signal output from the display apparatus.

The detecting of the defective state of the backlight in each of the display apparatuses may comprise, converting an AC voltage output from the backlight into a DC voltage, supplying a reference voltage, generating a comparing result signal as a result of a comparison between the converted DC voltage and the reference voltage, and generating a backlight state detecting signal as being turned on or off according to the comparing result signal.

The method may further comprise generating an active interrupt signal if the backlight state detecting signal that at least one backlight is defective is generated in the detecting of the defective state of the backlight.

BRIEF DESCRIPTION OF THE DRAWINGS

The above and/or other aspects and advantages of the present general inventive concept will become apparent and more readily appreciated from the following description of the embodiments, taken in conjunction with the accompany drawings of which:

FIG. 4 is an exemplary view of a message displayed on a screen to inform that a backlight of a corresponding display apparatus is defective.

DETAILED DESCRIPTION OF THE PREFERRED EMBODIMENTS

Figure 1:
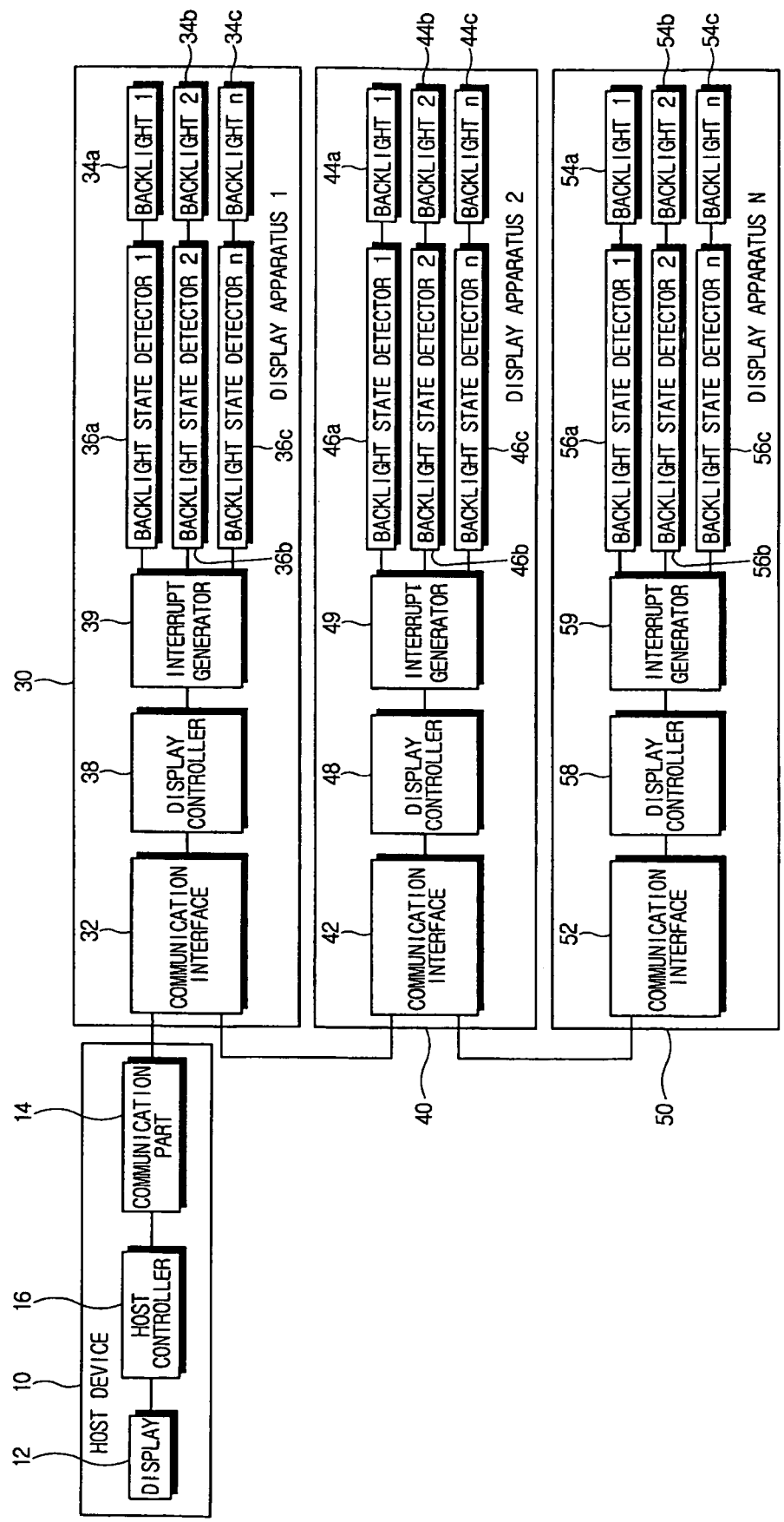
FIG. 1 is a control block diagram of a multi-display system according to the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

As shown in FIG. 1, a multi-display system according to an embodiment of the present general inventive concept may comprise a host device 10 comprising a display 12, a communication part 14, and a host controller 16; and a plurality of display apparatuses 30, 40 and 50 respectively comprising a communication interface 32, 42 and 52, a plurality of backlights 34a, 34b, 34c, 44a, 44b, 44c, 54a, 54b and 54c, a plurality of backlight state detectors 36a, 36b, 36c, 46a, 46b, 46c, 56a, 56b and 56c corresponding to the respective backlights 34a, 34b, 34c, 44a, 44b, 44c, 54a, 54b, and 54c to detect a defective state (or target state) of the respective backlights 34a, 34b, 34c, 44a, 44b, 44c, 54a, 54b and 54c, an interrupt signal generator 39, 49 and 59 to generate an interrupt signal, and a display controller 38, 48 and 58.

The communication part 14 in the host device 10 and the communication interfaces 32, 42 and 52 in the display apparatuses 30, 40 and 50 may adopt an RS-232C interface, however other wired/wireless interfaces may also be adopted.

One communication interface 32 among the plural communication interfaces 32, 42 and 52 (hereinafter, referred to as "first interface," "second interface" and "third interface," respectively) respectively associated with the plurality of display apparatuses 30, 40 and 50 (hereinafter, referred to as "first display", "second display" and "third display," respectively) can be connected to the communication part 14 in the host device 10 and can thus directly communicate data with the host device 10. The first interface 32 of the first display 30 connected to the host device 10 can be connected to the second interface 42 of the second display 40, and the second interface 42 can be connected to the third interface 52 of the third display 50. Thus, each of the first, second and third displays 30, 40 and 50 can be connected by a loop-out RS232C circuit.

However, a configurational aspect of the present general inventive concept is not limited to the foregoing configurational structure. The host device 10 and the display apparatuses 30, 40 and 50 may communicate with each other through various configurational structures.

The backlights 34a, 34b, 34c, 44a, 44b, 44c, 54a, 54b and 54c supply light to a display panel of the first, second and third displays 30, 40 and 50, and each display panel comprises a non-emissive display device, such as a liquid crystal display (LCD).

Figure 2:
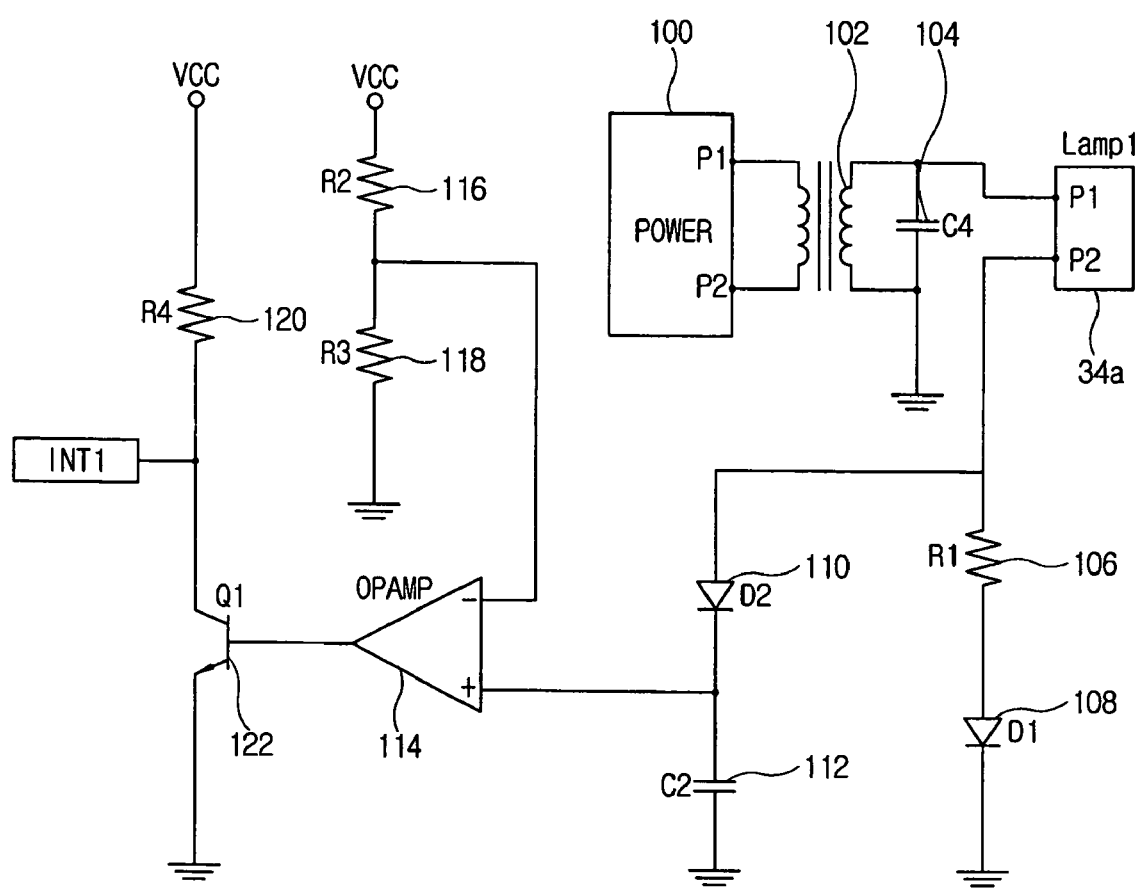
FIG. 2 is a detailed circuit diagram of a backlight state detector of the multi-display system of FIG. 1.

FIG. 2 is a detailed circuit diagram of one backlight state detector 36a of the plurality of backlight state detectors 36a, 36b, 36c, 46a, 46b, 46c, 56a, 56b and 56c corresponding to one backlight 34a of the plurality of backlights 34a, 34b, 34c, 44a, 44b, 44c, 54a, 54b and 54c. However, all of the plurality of backlight state detectors 36a, 36b, 36c, 46a, 46b, 46c, 56a, 56b and 56c corresponding to the plurality of backlights 34a, 34b, 34c, 44a, 44b, 44c, 54a, 54b and 54c can be configured similarly. Referring to FIG. 2, a driving power can be applied to the backlight 34a as follows.

A power supplier 100 can supply a voltage to a primary coil of a transformer 102, and thus a high voltage can be introduced to a secondary coil of the transformer 102. The high voltage introduced to the secondary coil of the transformer 102 can be applied to a capacitor 104 to output an alternating current (AC) voltage to the backlight 34a through a terminal P1 to thereby turn on the backlight 34a.

The backlight state detector 36a detects the backlight 34a to detect the defective state of the backlight 34a, and will be described in detail referring to FIG. 2.

The backlight state detector 36a may comprise an AC-DC converter to convert the alternating current voltage output from a terminal P2 of the backlight 34a into a direct current (DC) voltage, a reference voltage supplier to supply a predetermined reference voltage, a comparator 114 to compare the direct current voltage output from the AC-DC converter with the reference voltage and to output a comparing result signal in response thereto, and a switch 122 to generate a backlight state detecting signal by being selectively turned on or off according to the comparing result signal from the comparator 114.

The AC-DC converter may comprise a diode 110 to rectify the alternating current voltage output through the backlight 34a, and a capacitor 112 to smooth the voltage rectified by the diode 110. If the backlight 34a is defect-free, the direct current voltage output from the AC-DC converter becomes higher than a predetermined voltage level. On the other hand, if the backlight 34a is defective, the direct current voltage output from the AC-DC converter is decreased to a ground level, for example, and thus becomes lower than the predetermined voltage level. The AC-DC converter may further comprise a resistor 106 and a diode 108 to protect the diode 110 and/or the comparator 114 from a high voltage.

The reference voltage supplier may comprise a circuit designed to divide a Vcc voltage by resistors R2 and R3 116 and 118 which absorb the Vcc voltage and to thereby apply a given DC voltage as the reference voltage. In other words, the reference voltage, Vref, supplied by the reference voltage supplier can be calculated by the following equation.

$$Vref = Vcc \times \left(\frac{R3}{R2 + R3}\right)$$

Herein, the reference voltage can be set lower than the DC voltage output from the AC-DC converter if the backlight 34a is defect-free, and higher than the DC voltage output from the AC-DC converter if the backlight 34a is defective.

The comparator 114 may comprise an operational amplifier (OP-AMP) having a positive terminal at one end thereof to receive the DC voltage output from the AC-DC converter and a negative terminal at the other end thereof to receive the reference voltage supplied by the reference voltage supplier. The input voltages of the positive terminal and the negative terminal may be switched, however, so that the DC voltage from the AC_DC converter can be received at the negative terminal and the reference voltage can be received at the positive terminal.

In a case in which the backlight 34a is defect-free, the DC voltage applied to the positive terminal of the comparator 114 is higher than the reference voltage applied to the negative terminal of the comparator 114, and accordingly the comparator 114 generates a high signal.

However, in a case in which the backlight 34a is defective, the DC voltage applied to the positive terminal of the comparator 114 becomes lower than the reference voltage applied to the negative terminal of the comparator 114, and accordingly the comparator 114 generates a low signal.

The switch 122 may comprise a transistor having a base terminal to receive the signal from the comparator 114. The transistor may be a NPN transistor, the Vcc line with a resistor R4 can be connected to a collector, and a ground can be connected to an emitter. A PNP transistor may also be employed as the transistor.

In the case in which the backlights 34a is defect-free, the transistor can be turned on by the high signal generated from the comparator 114 and can output the backlight state detecting signal, for example an INT1 signal, in a low level.

In the case in which the backlight 34a is defective, the transistor can be turned off by the low signal generated from the comparator 114 and can output the backlight state detecting signal, for example the INT1 signal, in a high level.

Each of the backlight state detectors 36a, 36b, 36c, 46a, 46b, 46c, 56a, 56b and 56c can be designed with a similar configuration and operation with respect to the corresponding backlight 34a, 34b, 34c, 44a, 44b, 44c, 54a, 54b or 54c.

Further, the configuration of a backlight state detector is not limited to the backlight state detector 36a of FIG. 2, and may be variously designed to detect a defective backlight.

Figure 3:
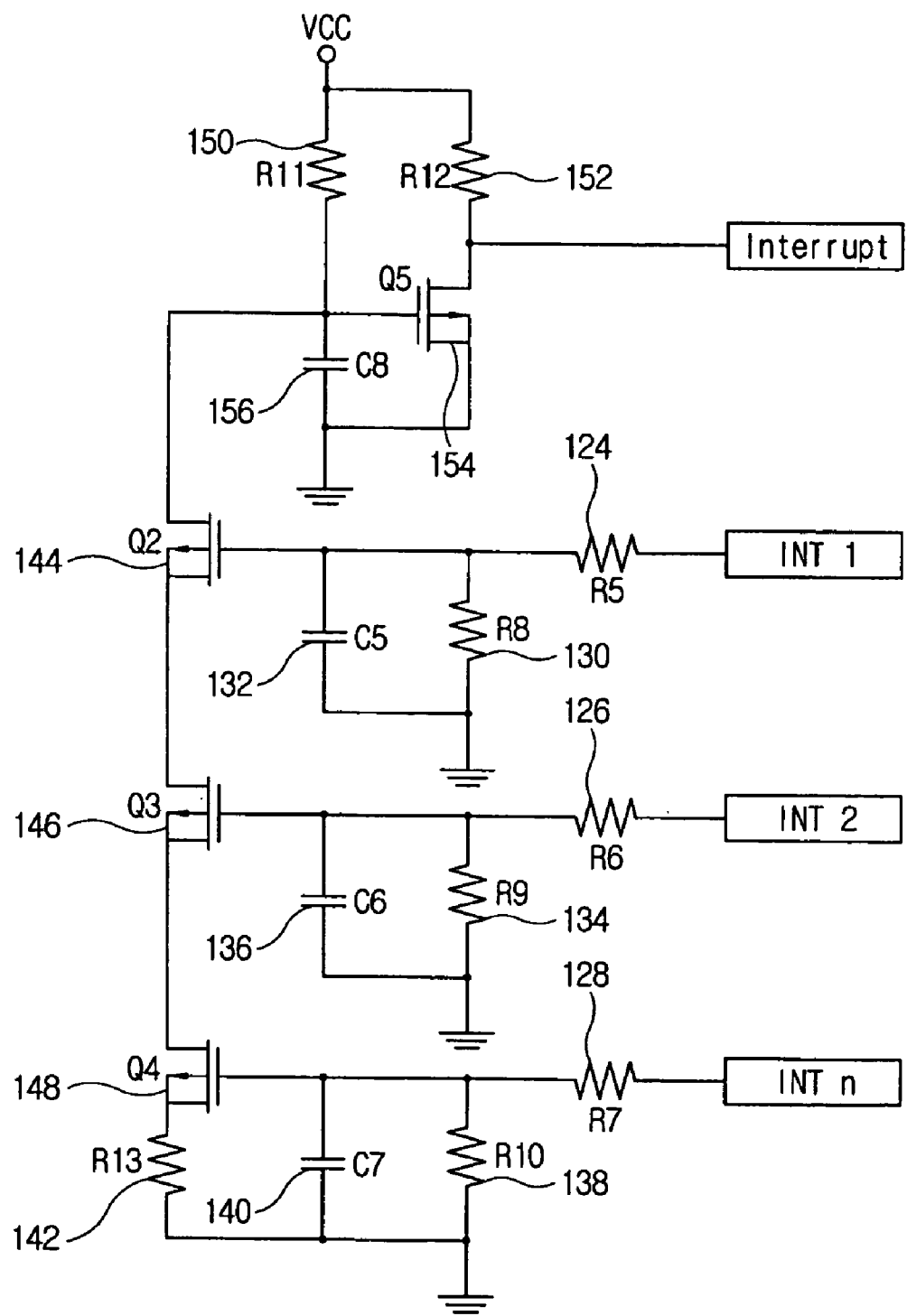
FIG. 3 is a detailed circuit diagram of an interrupt generator of the multi-display system of FIG. 1.

FIG. 3 is a detailed circuit diagram of the interrupt generator 39 of the first display 30. However, the interrupt generators 49 and 59 of the second and third displays can be configured similarly. As shown in FIG. 3, the interrupt generator 39 can generate an interrupt signal (Interrupt) in accordance with N number of the detecting signals (INT1, INT2, . . . , INTN) generated from N number of the backlight state detectors 36a, 36b and 36c.

The interrupt generator 39 may comprise a plurality of first switch elements 144, 146 and 148 corresponding to the plurality of backlight state detectors 36a, 36b and 36c, respectively, turned on/off according to each of the backlight state detecting signals respectively output from the backlight state detectors 36a, 36b and 36c, and a second switch element 154 to generate the interrupt signal and to turn on or off in accordance with a turn-on/off state of the first switch elements 144, 146 and 148. The first switch elements 144, 146 and 148 and the second switch element 154 may be designed as a P-Channel metal-oxide-semiconductor field-effect transistor (MOSFET).

If any of the backlights 34a, 34b and 34c are defect-free, the low backlight state detecting signals from the backlight detectors 36a, 36b and 36 corresponding to the defect-free backlights 34a, 34b and 34c can be input to gate terminals of the corresponding first switch elements 144, 146 and 148, but if any of the backlights 34a, 34b and 34c are defective, the high backlight state detecting signals from the backlight detectors 36a, 36b and 36c corresponding to the defective backlights 34a, 34b and 34c can be applied to the gate terminals of the corresponding first switch element 144, 146 and 148.

If all the backlight state detecting signals are in a low level, all of the first switch elements 144, 146 and 148 are turned on and the gate terminal of the second switch element 145 is connected to a ground. Accordingly, the low backlight state detecting signal can be applied to the gate terminal of the second switch element 154 and thus the second switch element 154 is turned on and can generate a low interrupt signal.

Meanwhile, if at least one of the backlight state detecting signals is in the high level, at least one of the first switch elements 144, 146 and 148 is turned off and the gate terminal of the second switch element 154 is connected to the Vcc line through resistors R11 and R12 150 and 152. Accordingly, the high backlight state detecting signal can be applied to the gate terminal of the second switch element 154 and thus the second switch element 154 is turned off and can generate a high interrupt signal.

The reference numerals 124, 126, 128, 130, 134, 138 and 142 represent resistors provided to restrict the amount of current, and the reference numerals 132, 136, 140 and 156 represent capacitors provided to reduce noise.

Meanwhile, the first switch element 144, 146 and 148 and the second switch element 154 may be designed as an N-channel MOSFET.

In a case in which the interrupt signal (Interrupt) generated from one of the interrupt signal generators 39, 49 and 59 is an active signal, the corresponding display controller 38, 48 or 58 can generate a defect detecting signal with an ID respectively assigned to the first display 30, the second display 40 or the third display 50 through the first, second or third interface 32, 42 and 52. The display controllers 38, 48 and 58 may be provided as a microcomputer having an interrupt signal input pin.

If the interrupt signal input pin of the microcomputer is high-active and the high interrupt signal is applied to one of the display controllers 38, 48 and 58, the display controller 38, 48 or 58 determines that at least one of the backlights 34a, 34b, 34c, 44a, 44b, 44c, 54a, 54b and 54c is defective and transmits a corresponding defect detecting signal to the host device 10.

Further, the interrupt signal input pin may be set to low-active. In this case, at least one of the backlights 34a, 34b, 34c, 44a, 44b, 44c, 54a, 54b and 54c is determined to be defective if the interrupt signal (Interrupt) generated from the corresponding interrupt generator 39, 49 or 59 is in the low level The display 12 may include a speaker to output a sound therethrough or a screen display to display an image thereon.

On the basis of the respective ID and the defect detecting signal output from each of the first display 30, the second display 40 and the third display 50 through the communication part 14, the host controller 16 can determine which of the display apparatuses 30, 40 and 50 have a defective backlight, and can display a detecting result on the display 12, as shown in FIG. 4. The host controller 16 can be run through a multiple display control (MDC) program typically employed to a multi-display system.

Figure 5:
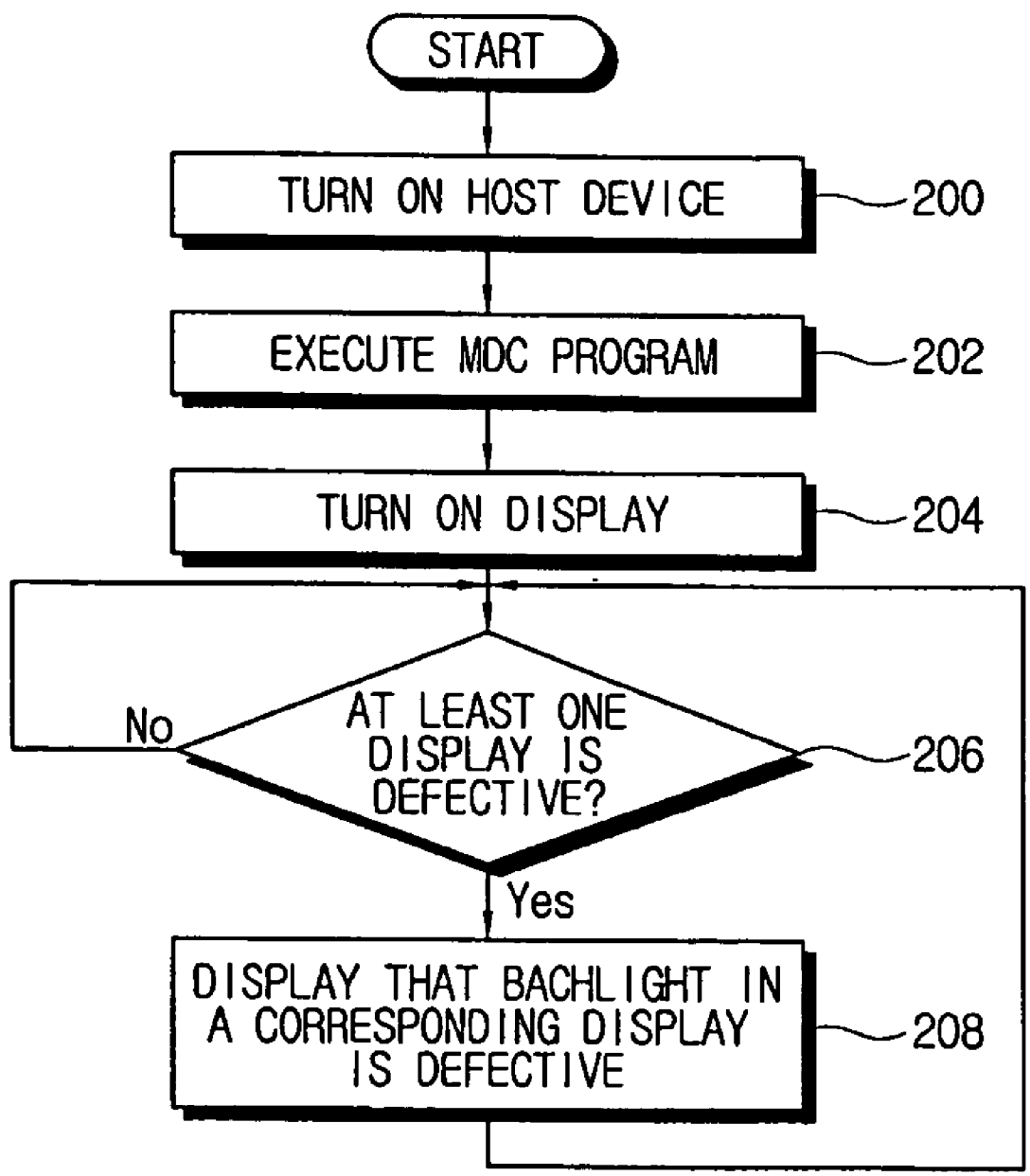
FIG. 5 is a control flow of the multi-display system of FIG. 1.

With the foregoing configuration and referring to FIG. 5, the multi-display system of FIG. 1 is controlled as follows.

First, the host device 10 is turned on at operation S200, and the MDC program is executed at operation S202. Then, each of the display apparatuses 30, 40 and 50 is turned on at operation S204. The display controllers 38, 48 and 58 detect whether at least one of the backlights 34a, 34b, 34c, 44a, 44b, 44c, 54a, 54b and 54c is defective on the basis of the interrupt signals generated from the interrupt generators 39, 49 and 59, at operation S206. If at least one of the backlights 34a, 34b, 34c, 44a, 44b, 44c, 54a, 54b and 54c is defective, the detecting result is transmitted to the host controller 16 through the communication interfaces 32, 42 and 52, and the host controller 16 displays a message on the display 12 to inform which of the display apparatuses 30, 40 and 50 has the defective backlight 34a, 34b, 34c, 44a, 44b, 44c, 54a, 54b and 54c, at operation S208. Thus, the multi-display system can detect whether any of the backlights 34a, 34b, 34c, 44a, 44b, 44c, 54a, 54b and 54c of the respective display apparatuses 30, 40 and 50 are defective from the host device 10.

Meanwhile, the number of the display apparatuses communicating with the host device may be not limited to a certain number.

The present general inventive concept provides a multi-display system to detect a defective backlight in each of a plurality of display apparatuses and to transmit a detecting result to a host device to allow the host device to display a message to inform that the backlight of the corresponding display apparatus is defective. Therefore, the defective backlight in each of the display apparatus can be easily detected.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi-display system comprising:
   a plurality of display apparatuses respectively comprising:
   at least one backlight,
   a backlight state detector provided in each of the plurality of display apparatuses to detect a defective state of the backlight,
   a communication interface provided in each of the plurality of display apparatuses, and
   a display controller provided in each of the display apparatuses to generate a corresponding signal for each of the display apparatuses through the communication interface on the basis of a detecting result of the backlight state detector;
   a host device comprising a display, a communication part to communicate with each of the plurality of display apparatuses, and a host controller to display a message on the display to inform that the backlight of a corresponding display apparatus is defective if it is determined that the backlight is defective according to the signal generated from the display controller; and
   an interrupt generator to generate an active interrupt signal and to output the active interrupt signal to the display controller if the backlight state detector detects the defective state of at least one of the backlights.

2. The multi-display system according to claim 1, wherein the backlight state detector comprises:
   an AC-DC converter to convert an AC voltage output from the backlight into DC voltage;
   a reference voltage supplier to supply a reference voltage;
   a comparator to compare the DC voltage generated from the AC-DC converter with the reference voltage supplied by the reference voltage supplier, and to generate a comparing result signal; and
   a switch to turn on or off according to the comparing result signal from the comparator and to generate a backlight state detecting signal.

3. The multi-display system according to claim 1, wherein the interrupt generator comprises a first switch to turn on or off according to the backlight state detecting signal generated from each of the backlight state detectors, and a second switch to generate an interrupt signal in accordance with the first switch being turned on or off.

4. A multi-display system comprising:
   a host device; and
   a plurality of display apparatuses capable of communicating with the host device, each of the plurality of display apparatus comprising a plurality of backlights, a plurality of backlight state detectors corresponding to the plurality of backlights to respectively detect a target state of the plurality of backlights, and a display controller to generate a signal to communicate the target state of the plurality of backlights to the host devices,
   wherein each of the plurality of display apparatus further comprises an interrupt generator to generate a signal to alert the display controller of the target of any of the backlights detected by the corresponding backlight state detectors.

5. The multi-display system according to claim 4, wherein each of the plurality of backlight state detectors comprises:
   an AC-DC converter to convert an AC voltage output from the backlight into a DC voltage;
   a reference voltage supplier to supply a reference voltage;
   a comparator to compare the DC voltage generated from the AC-DC converter with the reference voltage supplied by the reference voltage supplier, and to generate a comparing result signal; and
   a switch controlled by the comparing result signal to output a backlight detection result signal when a state of the corresponding backlight is the target state.

6. The multi-display system according to claim 5, wherein when one of the plurality of backlight state detectors detects the target state of the corresponding one of the plurality of backlights, the DC voltage generated by the AC-DC converter is smaller than the reference voltage.

7. The multi-display system according to claim 4, wherein the host device comprises:
   a communication part to communicate with the plurality of display apparatuses;
   a host controller to control the host to output an alert of the target state, when the host receives the signal generated by the display controller; and
   a display to display a visual alert of the target state.

8. The multi-display system according to claim 4, wherein the host device comprises:
   a communication part to communicate with the plurality of display apparatuses;
   a host controller to control the host to output an alert of the target state, when the host receives the signal generated by the display controller; and
   a speaker to output an audio alert of the target state.

9. A method of controlling a multi-display system having a plurality of display apparatuses respectively having at least one backlight, comprising:
   detecting a defective state of the backlight in each of the plurality of display apparatuses;
   generating a corresponding signal for each of the plurality of display apparatus on the basis of the detecting result, to output to a host device from the display apparatus;
   displaying a message informing that the backlight of a corresponding display apparatus is defective if the host device determines that the backlight is defective according to the signal output from the display apparatus; and
   generating an active interrupt signal if the defective state is detected in at least one of the display apparatuses.

10. The method according to claim 9, wherein the detecting of the defective state of the backlight in each of the display apparatuses comprises:
    converting an AC voltage output from the backlight into a DC voltage;
    supplying a reference voltage;
    generating a comparing result signal as a result of a comparison between the converted DC voltage and the reference voltage; and
    generating a backlight state detecting signal as being turned on or off according to the comparing result signal.

11. A display apparatus used with a multi-display system having a host device communicating with the display apparatus, comprising:
- a plurality of backlights;
- a plurality of backlight state detectors corresponding to the plurality of backlights to respectively detect a target state of the plurality of backlights;
- a display controller to generate a signal to communicate the target state of the plurality of backlights to the host device; and
- an interrupt generator to generate an interrupt signal to alert the display controller of the target state of the plurality of backlights.

12. The display apparatus according to claim 11, wherein the backlight state detectors each comprise:
- an AC-DC converter to generate a DC signal from a voltage signal from a corresponding one of the backlights;
- a comparator to compare the DC signal with a reference signal; and
- a switch to generate a switching signal representing the target state according to a comparing result of the comparator.

13. The display apparatus according to claim 12, wherein when one of the plurality of backlight state detectors detects the target state of the corresponding one of the plurality of backlights, the DC signal generated by the AC-DC converter has a lower voltage than the reference signal.

14. The display apparatus according to claim 11, wherein the interrupt generator comprises:
- a plurality of first switches corresponding to the plurality of backlight state detectors to respectively generate a plurality of first switch signals, each first switch signal representing a target state of a corresponding one of the backlights; and
- a second switch connected to the plurality of first switches to generate the interrupt signal to alert the display controller of the target state of the plurality of backlights.

15. A method of controlling a multi-display system having a plurality of display apparatuses respectively having at least one backlight, the method comprising:
- receiving an output signal from the backlight;
- generating a backlight state detecting signal having either a first state or a second state according to a characteristic of the output signal;
- outputting the backlight state detecting signal to a host device; and
- displaying a message informing that the backlight of a corresponding display apparatus is defective if the host device determines that the backlight is defective according to the state of the backlight state detecting signal.

* * * * *